(12) United States Patent
Hwang et al.

(10) Patent No.: US 11,105,534 B2
(45) Date of Patent: Aug. 31, 2021

(54) CONDENSING BOILER EMPLOYING EVAPORATION DEVICE

(71) Applicant: KYUNGDONG NAVIEN CO., LTD., Pyeongtaek-si (KR)

(72) Inventors: In Soo Hwang, Seoul (KR); Jun Kyu Park, Seoul (KR); Ki Seong Lee, Seoul (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 324 days.

(21) Appl. No.: 16/320,027

(22) PCT Filed: Aug. 14, 2017

(86) PCT No.: PCT/KR2017/008823
§ 371 (c)(1),
(2) Date: Jan. 23, 2019

(87) PCT Pub. No.: WO2018/034469
PCT Pub. Date: Feb. 22, 2018

(65) Prior Publication Data
US 2019/0271488 A1     Sep. 5, 2019

(30) Foreign Application Priority Data

Aug. 17, 2016   (KR) .......................... 10-2016-0104147

(51) Int. Cl.
*F24H 8/00* (2006.01)
*F24H 9/18* (2006.01)
(Continued)

(52) U.S. Cl.
CPC .............. *F24H 8/006* (2013.01); *F24F 6/00* (2013.01); *F24F 6/04* (2013.01); *F24F 11/00* (2013.01);
(Continued)

(58) Field of Classification Search
CPC .. F24F 11/0008; F24F 11/00; F24F 2006/006; F24F 2006/008; F24F 6/00;
(Continued)

(56) References Cited

U.S. PATENT DOCUMENTS 2,952,995 A * 9/1960 Brannick .............. F25D 23/006
62/295
3,543,001 A * 11/1970 Alexander .............. F24C 15/34
392/341
(Continued)

FOREIGN PATENT DOCUMENTS

CN         105135654 A  * 12/2015
KR      2000-0026731 A     5/2000
(Continued)

*Primary Examiner* — Steven S Anderson, III
(74) *Attorney, Agent, or Firm* — Stein IP LLC

(57) ABSTRACT

The purpose of the present invention is to provide a condensing boiler employing an eco-friendly evaporation device, in which condensed water generated in a latent heat exchanger is removed by using the evaporation device, so that the condensing boiler can be installed in a site without a processing facility for discharging condensed water and contribute to energy saving. For implementation thereof, the present invention comprises: a blower (110) for supplying a supply-air; a sensible heat exchanger (140) for absorbing combustion sensible heat generated in a combustion chamber (130) by combustion by a burner (120); a latent heat exchanger (150) for absorbing latent heat of steam included in combustion gas which has finished heat exchange in the heat sensible exchanger (140); and an evaporation device (160) which absorbs condensed water generated in the latent heat exchanger (150), and has an evaporation type humidifier (161) for evaporating and removing the absorbed condensed water by using air supplied from the blower (110).

10 Claims, 5 Drawing Sheets

(51) Int. Cl.
*F24H 9/20* (2006.01)
*F24F 6/00* (2006.01)
*F24F 11/00* (2018.01)
*F24H 9/00* (2006.01)
*G01F 23/00* (2006.01)
*F24F 6/04* (2006.01)

(52) U.S. Cl.
CPC ............ *F24F 11/0008* (2013.01); *F24H 8/00* (2013.01); *F24H 9/00* (2013.01); *F24H 9/0036* (2013.01); *F24H 9/18* (2013.01); *F24H 9/2035* (2013.01); *G01F 23/00* (2013.01); *F24F 2006/006* (2013.01); *F24F 2006/008* (2013.01); *Y02B 30/00* (2013.01)

(58) Field of Classification Search
CPC .... F24F 6/04; F24H 9/00; F24H 8/006; F24H 8/00; F24H 9/2035; F24H 9/0036; F24H 9/18; G01F 23/00; G01F 23/0007; Y02B 30/102; Y02B 30/104; Y02B 30/106
See application file for complete search history.

(56) References Cited

U.S. PATENT DOCUMENTS

2011/0114034 A1\* 5/2011 Aycock ................ F23L 11/005
122/14.2
2016/0123612 A1 5/2016 Lee et al.

FOREIGN PATENT DOCUMENTS

| KR | 20000026731 A | \* | 5/2000 | |
| KR | 20-0385443 Y1 | | 5/2005 | |
| KR | 10-2011-0036986 A | | 4/2011 | |
| KR | 10-2012-0096679 A | | 8/2012 | |
| KR | 10-2012-0118211 A | | 10/2012 | |
| KR | 20120118211 A | \* | 10/2012 | |
| KR | 10-2016-0050532 A | | 5/2016 | |
| KR | 20160050532 A | \* | 5/2016 | ......... B01D 39/1623 |

\* cited by examiner

CONDENSING BOILER EMPLOYING EVAPORATION DEVICE

CROSS-REFERENCE TO RELATED APPLICATIONS

This application is a national stage of International Application No. PCT/KR2017/008823, filed Aug. 14, 2017, which claims the benefit of priority of Korean Application No. 10-2016-0104147, filed Aug. 17, 2016 in the Korean Intellectual Property Office, the disclosures of which are incorporated herein by reference.

TECHNICAL FIELD

The present invention relates to a condensing boiler configured to employ an evaporation device, and more specifically, to a condensing boiler configured to contribute to energy saving and employ an eco-friendly evaporation device by removing condensate using an evaporation device.

BACKGROUND ART

A boiler is an apparatus configured to heat a heat medium in a sealed container using a heat source to heat a desired area, and includes a burner configured to combust fuel and a heat exchanger configured to transfer heat from the combusted high-temperature combustion gas to heating water.

Since a heat exchanger of an initial boiler uses only sensible heat generated during combustion of a burner and intactly discharges high-temperature combustion gas through a discharge duct, heat efficiency of the boiler is very low and a great deal of time is consumed to obtain high-temperature heating water.

Accordingly, a recently produced boiler includes a sensible heat exchanger configured to absorb sensible heat of combustion gas generated in a combustion chamber and a latent heat exchanger configured to absorb latent heat of vapor included in the combustion gas heat-exchanged in the sensible heat exchanger to improve heat efficiency, and the above-described boiler is called a condensing boiler.

The condensing boiler includes a blower configured to suction external air and supply air necessary for combustion, a burner configured to combust a mixture of the air supplied from the blower and fuel, a sensible heat exchanger configured to absorb combusted sensible heat generated from the burner, a latent heat exchanger configured to absorb latent heat of vapor included in the combustion gas heat-exchanged in the sensible heat exchanger, and a discharge duct through which the combustion gas which passes through the latent heat exchanger is discharged, and is formed in a structure in which a condensate collector configured to collect the condensate generated while the vapor included in the combustion gas passing through the latent heat exchanger is condensed and drain the condensate to the outside is formed at one side of a lower portion of the latent heat exchanger.

Since the above-described condensing boiler according to the related art is formed in a structure in which the condensate collector configured to collect the condensate and drain the condensate to the outside and a condensate drain port are formed, the condensing boiler cannot be installed in the field without a condensate drainage processing facility.

Further, in the condensing boiler according to the related art, since an operation of the boiler is stopped due to a drainage failure of the condensate which is frozen in winter, inconvenience and complaints of consumers are caused.

In addition, although the boiler includes a siphon having a U-shaped trap structure to prevent an outflow of the combustion gas to the room therein, the condensate drain port is frequently blocked by foreign matter generated in the heat exchanger or the like.

As an example of the prior art for solving the problems, a configuration of a condensing gas water heater disclosed in Chinese Laid-Open Patent Application No. 104180525 is shown in FIG. 1.

The condensing gas water heater disclosed in the Laid-Open Patent Application is provided with an ultrasonic humidification module 5 under a water collecting device 3 in which the condensate is collected, wherein the ultrasonic humidification module 5 is configured to drain the condensate in the form of droplets in air due to an action of a vibrator.

However, according to the configuration in which an ultrasonic humidifier is applied like the above to remove the condensate, power consumption significantly increases, durability is low, and the vibrator should be periodically managed and replaced.

Further, since a particle of vapor generated from the ultrasonic humidifier is large and a temperature of the vapor is low, the vapor is formed in a droplet state in the discharge duct and condensed on a surface of the discharge duct, and thus introduced into the boiler again. Accordingly, operations of the boiler and the water heater are stopped and droplets are mixed with dust or bacteria to pollute the inside of the boiler.

DISCLOSURE

Technical Problem

The present invention is directed to providing a condensing boiler configured to contribute to energy saving and employ an eco-friendly evaporation device by removing condensate generated in a latent heat exchanger using an evaporation device to allow installation in the field without a condensate drainage processing facility.

Technical Solution

According to one aspect of the present invention, a condensing boiler configured to employ an evaporation device includes: a blower (110) configured to supply a supply-air; a sensible heat exchanger (140) configured to absorb combusted sensible heat generated from a combustion chamber (130) by combustion of a burner (120); a latent heat exchanger (150) configured to absorb latent heat of vapor included in combustion gas heat-exchanged in the sensible heat exchanger (140); and an evaporation device (160) including an evaporative humidifier (161) configured to absorb condensate generated from the latent heat exchanger (150), and evaporate and remove the absorbed condensate using the air supplied from the blower (110).

Filters (161a) stacked in a ventilable corrugated structure and formed of cellulose and one material among, PET, PP, nylon, and rayon may be provided in the evaporative humidifier (161).

The evaporative humidifier (161) may have a supporting body (161b) for reinforcement between the neighboring filters (161a).

The evaporative humidifier (161) may be detachably coupled to the inside of the evaporation device (160).

A seating part (162) configured to support both bottom surfaces of the evaporative humidifier (161) may be provided in the evaporation device (160) and a cover (163) configured to open and close a space (163a) through which the evaporative humidifier (161) enters and exits may be provided at a front surface of the evaporation device (160).

A water level sensor (164) consisting of a high water level sensor (164a) and a low water level sensor (164b) configured to sense a level of the condensate may be provided in the evaporation device (160).

The condensing boiler may further include an alert generation part (190) controlled to issue an alert when the condensate is sensed at the high water level sensor (164a).

The blower (110) may be controlled to stop operating when the condensate is not sensed at the low water level sensor (164b) due to evaporation thereof.

The blower (110) may be controlled to stop operating after being operated for a set time when the condensate is not sensed at the low water level sensor (164b) due to the evaporation thereof.

A bottom of the evaporation device (160) may be formed of an inclined surface (160b) having a downward slope toward a side at which the water level sensor (164) is provided.

A temperature sensor (165) configured to sense a temperature of the condensate may be provided in the evaporation device (160).

The burner (120) may be controlled to perform a combustion operation when the temperature of the condensate sensed at the temperature sensor (165) is lower than a set temperature.

A damper (166) configured to open and close a vent so that air is accessible may be provided at a side surface of the evaporation device (160).

A visible window (167) configured to observe the inside of the evaporation device (160) with the naked eye may be provided at a front surface of the evaporation device (160).

Advantageous Effects

According to a condensing boiler configured to employ an evaporation device according to the present invention, since condensate generated in a latent heat exchanger is removed using an evaporation device, the condensing boiler can be installed in the field without a condensate drainage processing facility to reduce energy.

Further, since an evaporative humidifier formed with a corrugated structure is employed in the evaporation device, absorption and removal efficiency of the condensate can be improved by maximizing a surface area of a filter, and a static pressure can be lowered by sufficiently securing a flow space through which combustion gas passes, and thus additional power consumption can be prevented by minimizing the load of a blower.

In addition, since the evaporative humidifier is formed of a cellulose material, the removal efficiency of the condensate can be improved by further improving moisture storing performance and a spreading characteristic of water, and since a particle of vapor evaporated from the filter becomes very small unlike a case in which an ultrasonic humidification module of the related art is employed, reintroduction of the condensate in a droplet state can be prevented and contaminated dust or bacteria in the evaporation device can be smoothly discharged.

In addition, since a water level sensor capable of sensing the remaining condensate is provided, an alert is issued when a high water level is sensed, and when a lower water level due to reduction of the condensate is not sensed, wasted power consumption can be prevented by stopping an operation of the blower.

In addition, since the blower is additionally operated for a set time even when the lower water level due to the reduction of the condensate is not sensed, moisture which remains in the filter can be also removed.

In addition, since a temperature sensor configured to sense a temperature of the condensate is provided, when the temperature of the condensate is lower than or equal to a set temperature in winter, the boiler can be prevented from freezing and bursting by allowing a combustion operation to be performed in a burner and operating the boiler with a minimal heat quantity.

In addition, since an evaporative humidifier is configured in a detachable structure in the evaporation device, convenience of maintenance work of the evaporation device can be improved.

Figure 1:
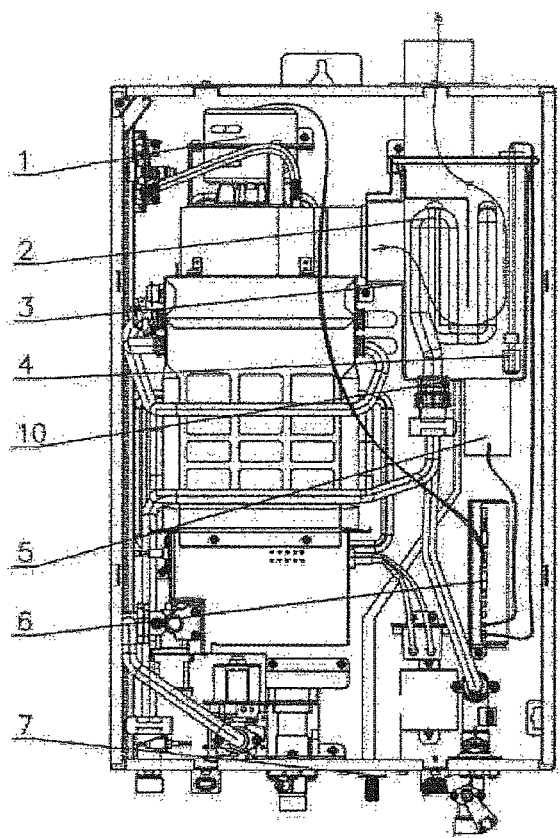
FIG. 1 is a configuration diagram of a condensing gas water heater according to the related art.

| Reference numerals | |
|---|---|
| 100: condensing boiler | 110: blower |
| 120: burner | 130: combustion chamber |
| 140: sensible heat exchanger | 150: latent heat exchanger |
| 160: evaporation device | 160a: condensate accommodation space |
| 160b: inclined surface | 161: evaporative humidifier |
| 161a: cellulose filter | 162: seating part |
| 163: cover | 164: water level sensor |
| 164a: high water level sensor | 164b: low water level sensor |
| 165: temperature sensor | 166: damper |
| 167: visible window | 170: discharge duct |
| 180: control part | 190: alert generation part |

MODES OF THE INVENTION

Hereinafter, a configuration and an action of an embodiment of the present invention will be described in detail with reference to the accompanying drawings.

Figure 2:
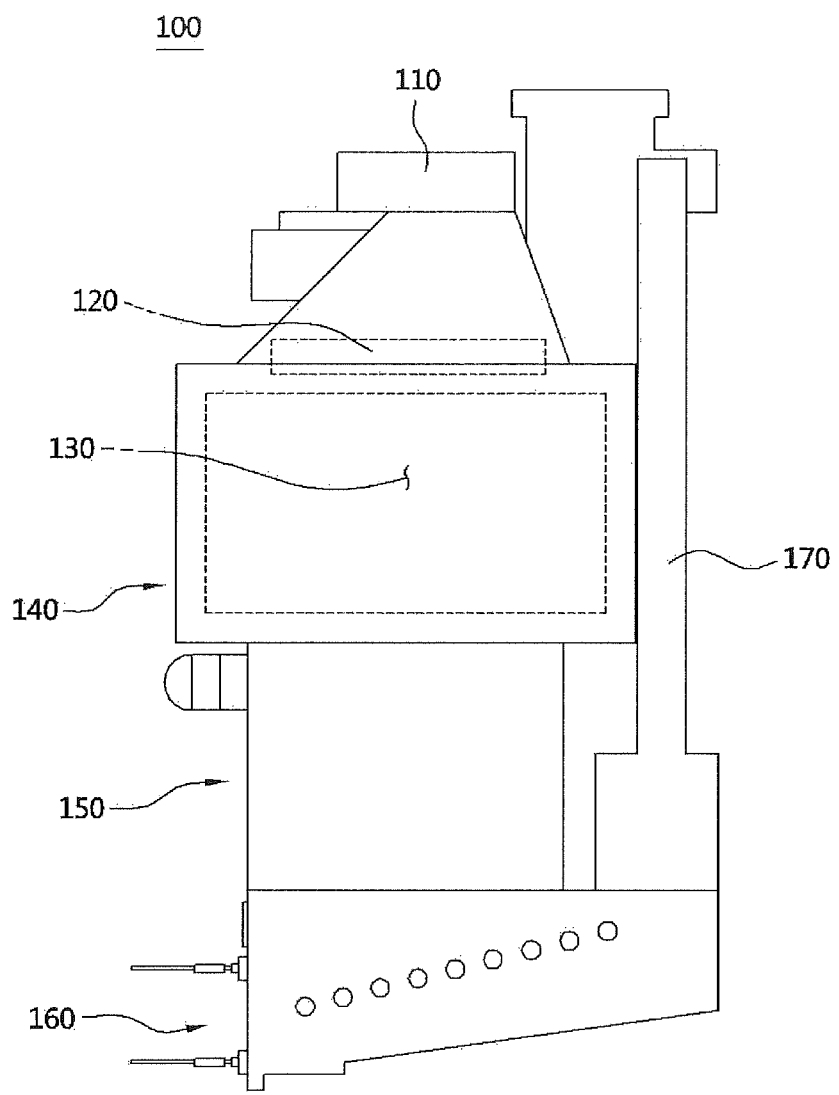
FIG. 2 is a configuration diagram of a condensing boiler configured to employ an evaporation device according to the present invention.
Figure 3:
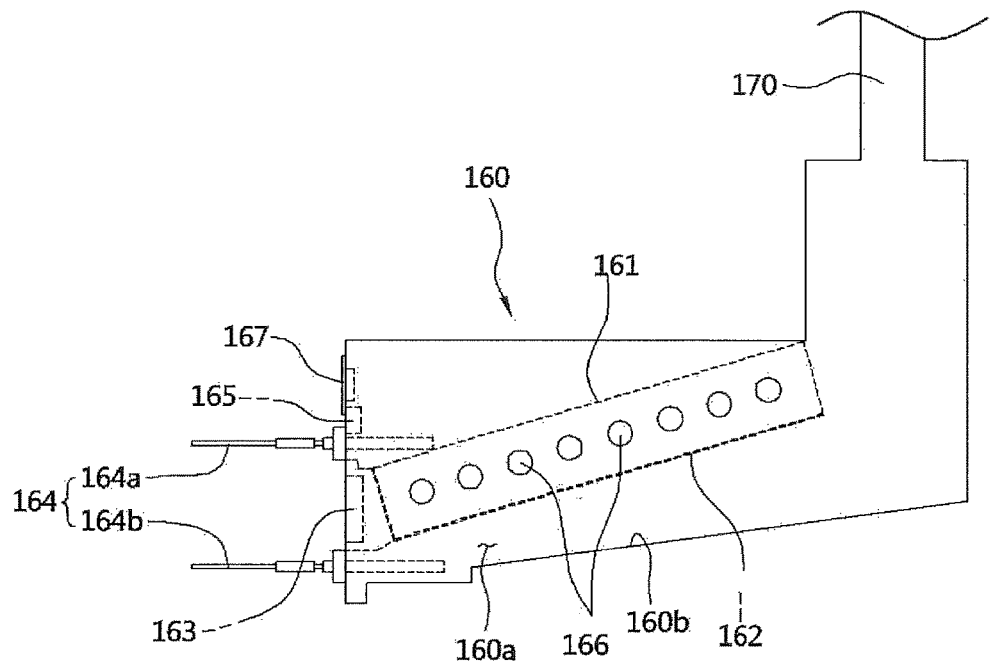
FIG. 3 is a side view of the evaporation device shown in FIG. 2.

Referring to FIG. 2, a condensing boiler 100 configured to employ an evaporation device according to the present invention includes a blower 110 configured to supply a supply-air, a burner 120 configured to ignite a fuel-air mixture of combustion gas and the air supplied from the blower 110, a combustion chamber 130 in which the mixture is combusted, a sensible heat exchanger 140 configured to absorb sensible heat of combustion gas generated in the combustion chamber 130 to heat a heat medium, a latent heat exchanger 150 configured to absorb latent heat of vapor included in the combustion gas heat-exchanged in the sensible heat exchanger 140, an evaporation device 160 configured to absorb condensate generated in the latent heat exchanger 150 and evaporate and remove the absorbed condensate using the air supplied from the blower 110, a discharge duct 170 through which the combustion gas and the vapor which pass through the evaporation device 160 are discharged, and a control part 180 configured to control an operation of the condensing boiler 100.

Referring to FIGS. 3 to 7, an evaporative humidifier 161 capable of absorbing condensate collected in a condensate accommodation space 160a, filtering foreign matter included in the condensate, and evaporating and draining only moisture is provided in the evaporation device 160.

Figure 5:
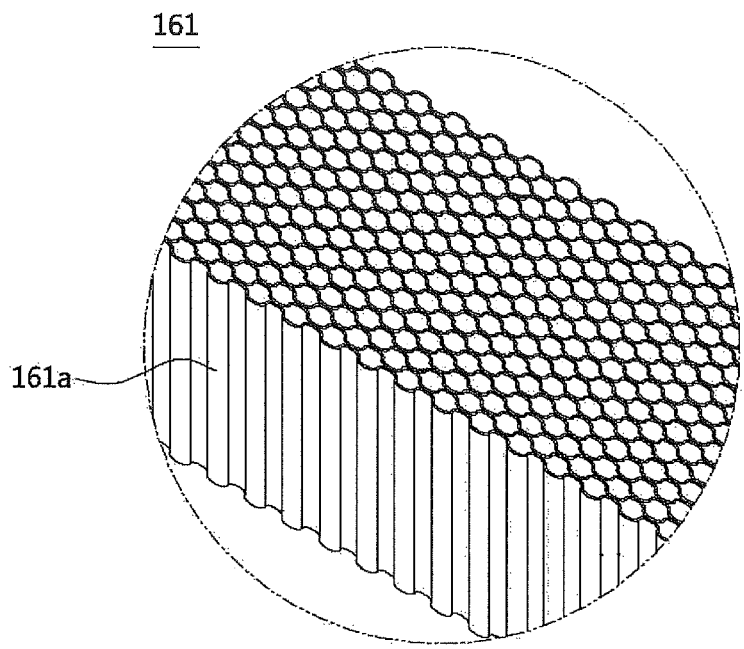
FIG. 5 is a partial perspective view of the evaporative humidifier.
Figure 6:
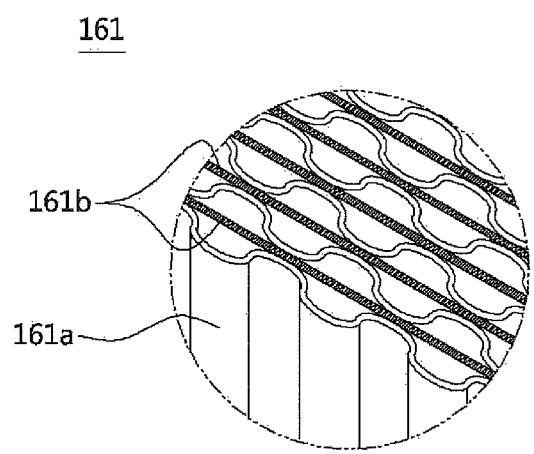
FIG. 6 is a view in which a supporting body is provided in the evaporative humidifier.
Figure 7:
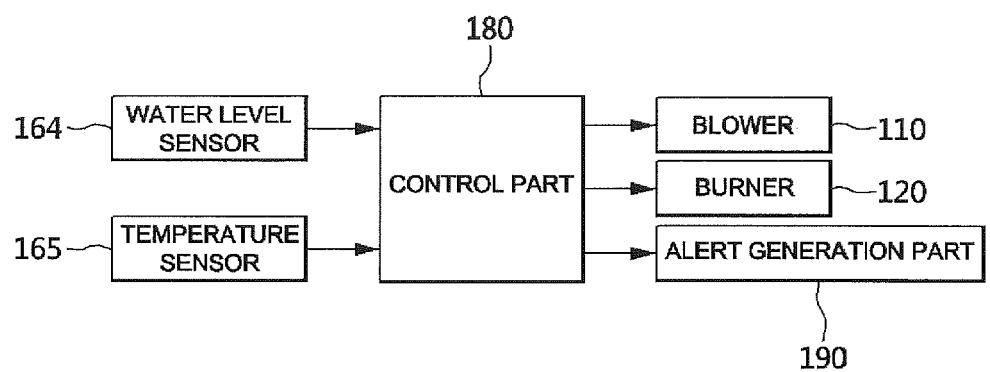
FIG. 7 is a control block diagram of the condensing boiler configured to employ the evaporation device according to the present invention.

As an example, as shown in FIG. 5, the evaporative humidifier 161 may be formed with a ventilable corrugated structure and stacked, and may include filters 161a made of a cellulose material. As described above, when each of the filters 161a made of a cellulose material includes the corrugated structure, an absorption and storing performance of the condensate and a spreading characteristic of water toward whole surfaces of the filters 161a may be improved by maximizing surface areas of the filters 161a to efficiently remove the condensate. Further, the filters 161a may be formed of one polymer material among PET, PP, nylon, and rayon to improve durability. In addition, as shown in FIG. 6, a supporting body 161b may be used for reinforcement in a vertical direction between neighboring filters 161a. The filters 161a are in contact with both side surfaces of the supporting body 161b to improve stability of the structure.

Further, since spaces through which the combustion gas passes may be sufficiently secured between the filters 161a stacked with the corrugated structure, pressure loss generated during a flow of the combustion gas may be minimized, and accordingly, the combustion gas may be smoothly exhausted and additional power consumption may be prevented by minimizing the load of the blower 110.

In addition, when the evaporative humidifier 161 is employed, the moisture absorbed in the filters 161a is evaporated by the air supplied from the blower 110, and in this case, since water molecules are spaced one by one from the surfaces of the filters 161a to be evaporated, sizes of particles of vapor evaporated from the filters 161a may become very small to prevent a problem in which various types of foreign matter such as bacteria, dust, and the like are attached to and discharged with the particles of the vapor.

Accordingly, when an ultrasonic humidification module is employed in the related art, the foreign matter is included in and discharged with the particles of the evaporated vapor and thus causes environmental pollution. However, the present invention may solve a problem in which only pure water molecules are evaporated and discharged, and then reintroduced into a room in a droplet state by employing the evaporative humidifier 161 in the evaporation device 160.

Figure 4:
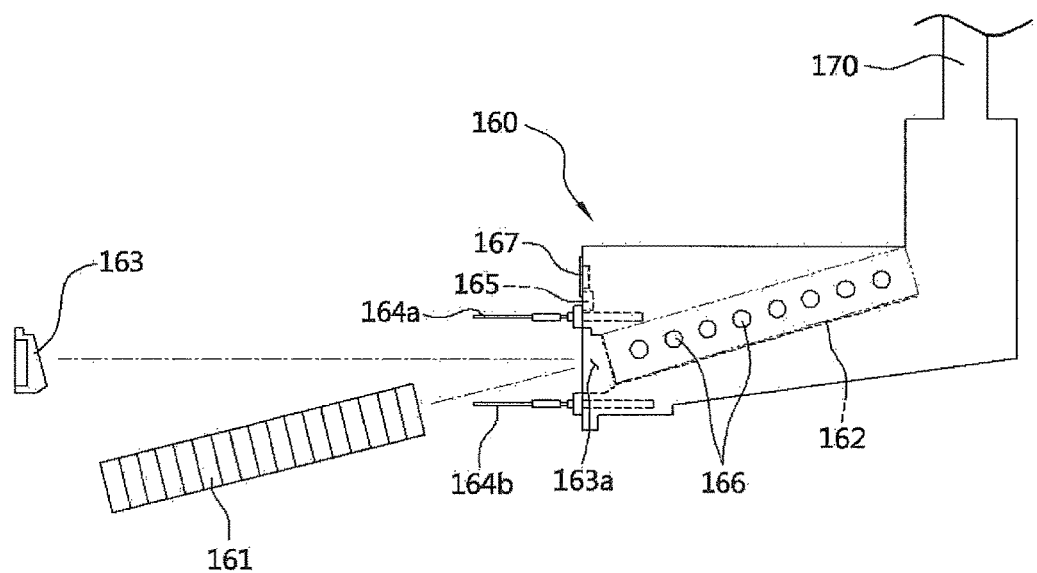
FIG. 4 is a side view showing a state in which an evaporative humidifier is separated from the evaporation device.

Referring to FIG. 4, the evaporative humidifier 161 is coupled to the inside of the evaporation device 160 in a detachable structure. To this end, a seating part 162 configured to support both bottom surfaces of the evaporative humidifier 161 so that the evaporative humidifier 161 may enter and exit along frontward and backward directions in a sliding manner is provided in the evaporation device 160.

Further, a cover 163 configured to open and close a space 163a through which the evaporative humidifier 161 enters and exits is provided at a front surface of the evaporation device 160.

As described above, since the evaporative humidifier 161 includes the structure which is detachable from the inside of the evaporation device 160, maintenance of the evaporation device 160 and a process of replacing the evaporative humidifier 161 may be easily performed and thus convenience of use may be improved.

Meanwhile, a water level sensor 164 configured to sense a water level of the condensate collected in the condensate accommodation space 160a is provided in the evaporation device 160.

The water level sensor 164 may include a high water level sensor 164a and a low water level sensor 164b provide at locations vertically spaced apart from each other. Further, since the bottom of the evaporation device 160 is formed of an inclined surface 160b having a downward slope toward a side at which the water level sensor 164 is provided, the condensate collected in the condensate accommodation space 160a is guided to move in a direction toward the water level sensor 1, and thus the water level of the condensate may be quickly sensed.

When condensate is sensed at the high water level sensor 164a, the control part 180 controls an alert generation part 190 to issue an alert, and thus a user who recognizes the alert may quickly take measures for removing the condensate.

When the condensate is not sensed at the low water level sensor 164b due to evaporation thereof, the control part 180 controls the blower 110 so that an operation of the blower 110 is stopped, and thus power consumption due to an unnecessary operation of the blower 110 is prevented.

When the condensate is not sensed at the low water level sensor 164b due to the evaporation thereof, the control part 180 may control the blower 110 so that an operation of the blower 110 is stopped after being additionally operated for a set time to evaporate and remove even moisture of the condensate which remains in the filters 161a.

Meanwhile, a temperature sensor 165 configured to sense a temperature of the condensate is provided in the evaporation device 160. When only the blower 110 is operated to remove the condensate in an environment in which a temperature of external air is low as in the winter season, freezing and bursting of the boiler may be caused.

In order to prevent the above-described problem, when the temperature sensed at the temperature sensor 165 is lower than or equal to a set temperature, since the burner 120 is controlled to perform a combustion operation by operating the boiler with a set minimum heat quantity, the temperature of heating water is operated at a temperature at which condensate is not generated to remove the remaining condensate.

Meanwhile, a damper 166 configured to open and close a vent so that air is accessible may be provided at a side surface of the evaporation device 160. The damper 166 may be closed in the case in which a risk of freezing and bursting is not present other than winter and may be opened in the case in which the risk of freezing and bursting is present as in the winter season so that the condensate which remains in the evaporation device 160 while an operation of the boiler is stopped may be evaporated by circulation of the air.

A visible window 167 configured to allow the inside of the evaporation device 160 to be observable by the naked eye may be provided at a front surface of the evaporation device 160. The user may check whether the condensate remains in the evaporation device 160 and a state of each of the filters 161a through the visible window 167 and perform necessary maintenance work.

As described above, in the present invention, since the evaporation device 160 including the evaporative humidifier 161 is applied, the condensing boiler 100 may be allowed to be installed in the field without a condensate drainage processing facility to contribute to energy saving and environment protection.

Further, although an example of the condensing boiler is described in the present description, the present invention may also be applied to a condensing water heater.

As described above, the present invention is not limited to the above-described embodiment, it will be apparent to those skilled in the art that the present invention may be modified without departing from the spirit of the present invention in the claims, and the modification is included in the scope of the present invention.

The invention claimed is:

1. A condensing boiler configured to employ an evaporation device, comprising:
    a blower configured to supply a supply-air
    a sensible heat exchanger configured to absorb combusted sensible heat generated in a combustion chamber by combustion of a burner;
    a latent heat exchanger configured to absorb latent heat of vapor included in combustion gas heat-exchanged in the sensible heat exchanger; and
    an evaporation device including an evaporative humidifier configured to absorb condensate generated in the latent heat exchanger, and evaporate and remove the absorbed condensate using the air supplied from the blower,
    wherein a water level sensor consisting of a high water level sensor and a low water level sensor configured to sense a level of the condensate is provided in the evaporation device,
    wherein the blower is stopped after being operated for a set time when the condensate is not sensed at the low water level sensor due to evaporation thereof.

2. The condensing boiler of claim 1, wherein filters stacked in a ventilable corrugated structure and formed of cellulose and any one material among PET, PP, nylon, and rayon are provided in the evaporative humidifier.

3. The condensing boiler of claim 2, wherein the evaporative humidifier has a supporting body for reinforcement between the neighboring filters.

4. The condensing boiler of claim 1, wherein the evaporative humidifier is detachably coupled to the inside of the evaporation device.

5. The condensing boiler of claim 4, wherein:
    a seating part configured to support both bottom surfaces of the evaporative humidifier is provided in the evaporation device; and
    a cover configured to open and close a space through which the evaporative humidifier enters and exits is provided at a front surface of the evaporation device.

6. The condensing boiler of claim 1, wherein a bottom of the evaporation device is formed of an inclined surface having a downward slope toward a side at which the water level sensor is provided.

7. The condensing boiler of claim 1, wherein a temperature sensor configured to sense a temperature of the condensate is provided in the evaporation device.

8. The condensing boiler of claim 7, wherein the burner performs a combustion operation when the temperature of the condensate sensed at the temperature sensor is lower than a set temperature.

9. The condensing boiler of claim 1, wherein a damper configured to open and close a vent so that air is accessible is provided at a side surface of the evaporation device.

10. The condensing boiler of claim 1, wherein a visible window configured to observe the inside of the evaporation device with the naked eye is provided at a front surface of the evaporation device.

* * * * *